April 13, 1948.   W. W. HANSEN   2,439,388
RESONATOR WAVE METER
Filed Dec. 12, 1941   2 Sheets-Sheet 1
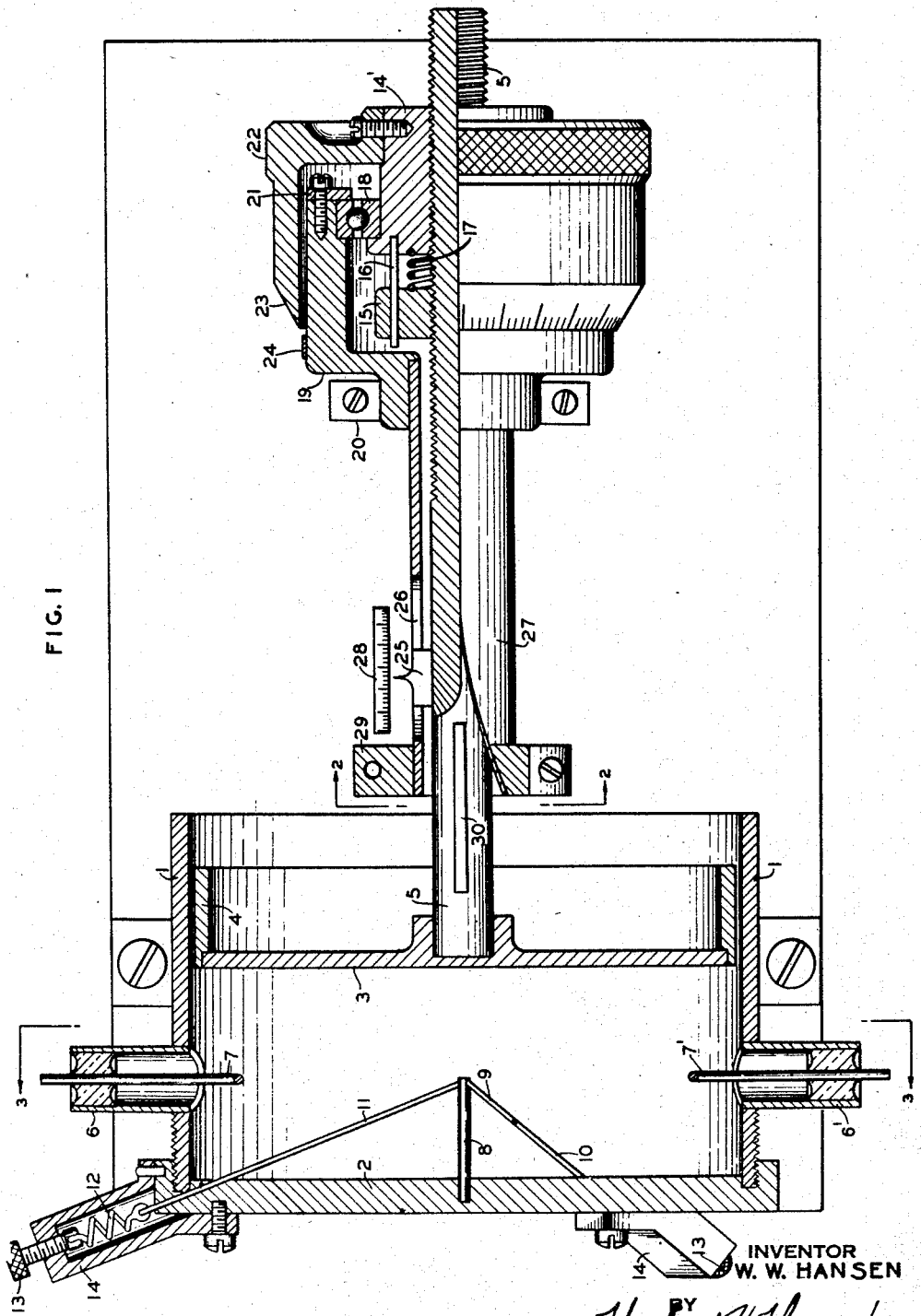

April 13, 1948.　　　W. W. HANSEN　　　2,439,388
RESONATOR WAVE METER
Filed Dec. 12, 1941　　　2 Sheets-Sheet 2
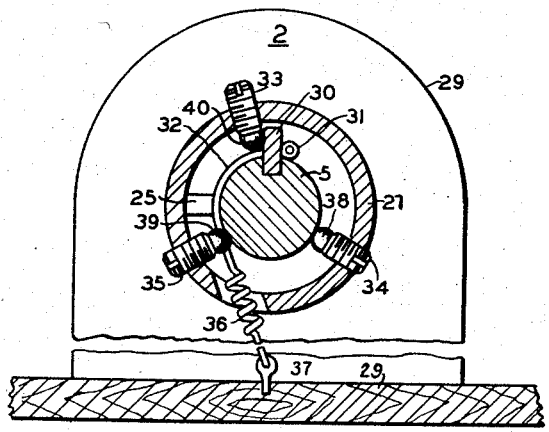
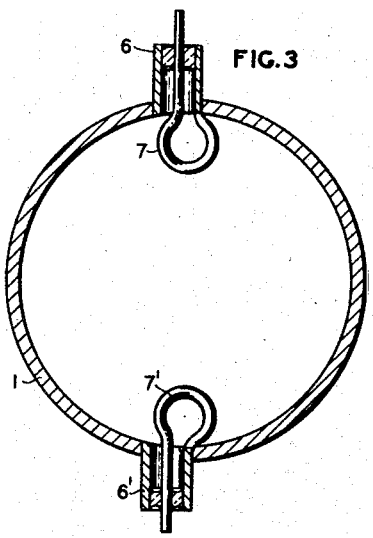
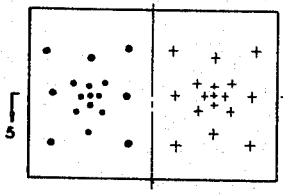
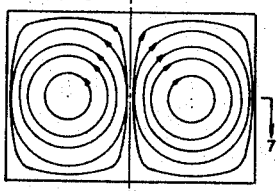
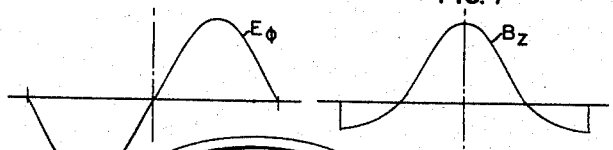
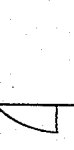
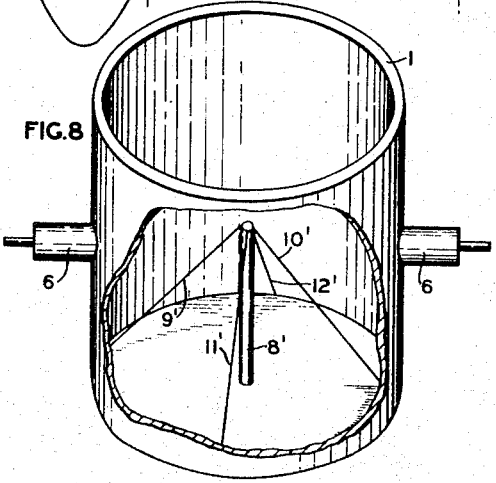
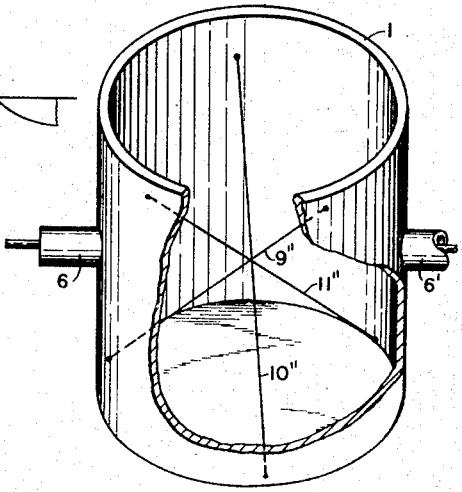
INVENTOR
W. W. HANSEN
BY
Herbert D. Thompson
his ATTORNEY Patented Apr. 13, 1948

2,439,388

UNITED STATES PATENT OFFICE 2,439,388

RESONATOR WAVE METER

William W. Hansen, Garden City, N. Y., assignor to The Sperry Corporation, a corporation of Delaware Application December 12, 1941, Serial No. 422,715

12 Claims. (Cl. 250—39)

This invention relates, generally, to wavemeters of the cavity resonator type, and more specifically, to a precision wavemeter of a hollow resonator type suitable for use at wavelengths on the order of 10 centimeters and capable of high accuracy and resolving power.

It is well known that heterodyne methods making use of frequency controlled standards offer the highest standards of accuracy in this wavelength region as in other wavelength regions, but resonant circuit wavemeters are more useful because of their simplicity of design and operation. Resonators for this purpose of the general class known as concentric line resonators, as described in Patent No. 2,245,138, issued June 10, 1941, in the name of Paul D. Zottu, are well known to the art. The higher modes or frequencies of oscillation of such concentric line resonators usually lie much higher in frequency than the lowest mode, and the wavelength of the lowest mode is a very simple function of the dimensions of the resonator, depending solely on the length of the cavity.

Such wavemeters have been capable of only a rather limited accuracy of about one part in a thousand, an accuracy suitable for some purposes. For many purposes, such as for use as a secondary standard for calibrating wavemeters with which routine measurements are to be made, for measuring frequency differences, for examining the spectra of transmitters, or for other uses, higher accuracy, higher resolving power resonator wavemeters are desirable.

The first requirement in construction of a resonator for a wavemeter of the character described is that the width of the resonance curve for the resonator be made as small as possible. The quantity Q, which is determined by the width of the resonance curve, has been shown by William W. Hansen in "A type of electrical resonator," Journal of Applied Physics, vol. 9, October 1938, to be $\pi$ times the ratio of the energy stored in the resonator to the energy lost per half-cycle, or to be expressed by the equation:

$$Q = \frac{\sqrt{2}}{\lambda} \frac{\int B^2 d\tau}{\int B^2 |d\sigma|} \cdot \frac{\lambda}{\delta} \quad (1)$$

where $\lambda$ is the wavelength, $d\tau$ an element of volume in the resonator, $d\sigma$ is an element of the conducting surface of the resistor, $\delta$ is the skin depth, and B is the instantaneous magnetic field strength.

For a given value of $\lambda$ and for a given resonator material, Q is determined by:

$$\frac{\int B^2 d\tau}{\int B^2 |d\sigma|}$$

as $\delta$ is a function of $\lambda$ and of the resistivity of the conducting surface of the resonator. It is well known that non-reentrant types of resonators, such as spheres, cylinders, etc., in which B is rather uniform, give high volume to surface ratios, and thus high values of Q, whereas, as shown in the aforementioned publication, reentrant types of cavity resonators, which, in the limit become concentric transmission line types of resonators, for a given wavelength require very reduced diameter, thus reducing Q because the volume to surface ratio becomes greatly reduced. It is also therein shown that for a given conductivity of the conducting surface and for a fixed value of $\lambda$, no electrical resonator can be devised which will operate at its lowest frequency with a Q value greatly in excess of $\lambda/\delta$; and, that, on the other hand, if operation on higher modes of vibration is allowed, values of Q considerably greater than $\lambda/\delta$ may be obtained.

It is therefore the principal object of this invention to provide a cavity resonator wavemeter for use at ultra high frequencies of non-reentrant type having no great variation in B and the lowest feasible volume to surface ratio consistent with the mechanics of practical usage.

Another object of this invention is to provide a cavity resonator wavemeter having a shape which provides the largest ratio of energy stored in the resonator to energy lost per half-cycle consistent with useable mechanical design.

Still another object of my invention is to provide a resonator wavemeter operating on a mode of oscillation whose frequency is enough spaced from adjacent frequencies that easy discrimination is possible between the chosen frequency and undesired frequencies.

An important feature of this invention is to provide in a resonator wavemeter, means for suppressing all modes of oscillation except the particular mode chosen to give highest ratio of energy stored in the resonator to energy lost per half-cycle.

Another feature of this invention resides in the provision of a cavity resonator wavemeter having a movable member by means of which the resonator is operative at different frequencies, the resonator having a mode of oscillating electric field set up therein such that no energy losses occur at the movable member.

A further feature of this invention is to construct a cavity resonator wavemeter of this character having calibrated setting means by which it is possible to precisely repeat a given wavelength determined position.

Another feature of this invention is to provide means in a cavity resonator wavemeter of this character for changing the frequency range by suitable overlapping steps.

Other objects and advantages will become apparent from the specification, taken in connection with the accompanying drawings wherein the invention is embodied in concrete form.

In the drawings,

Fig. 1 is a partial cross-section of a plan view of a cavity resonator wavemeter constructed in accordance with the present invention.

Fig. 2 is a fragmentary cross-section view of a portion of Fig. 1, taken along the line 2—2 of Fig. 1.

Fig. 3 is a cross-section view taken along the line 3—3 of Fig. 1.

Fig. 4 is an explanatory plot of the electric field of the preferred mode of vibration used in this invention.

Fig. 5 is a graph of the electric field of Fig. 4.

Fig. 6 is an explanatory plot of the magnetic field of the preferred mode of vibration used in this invention.

Fig. 7 is a graph of the magnetic field of Fig. 6.

Fig. 8 is a perspective view of a modified form of the means used to suppress unwanted modes of oscillation in the resonator of this invention; and Fig. 9 is an alternate construction of Fig. 8.

Similar characters of reference are used in all of the above figures to indicate corresponding parts.

It is easily seen that to satisfy my need for a resonator of large volume to surface ratio and which may be made adjustable over a reasonable range of frequencies, and to satisfy other aforementioned conditions I am limited in choice chiefly to any type of cylinder. Of the possible cylindrical types of resonators, I shall illustrate the principles of my invention by using a resonator wavemeter, as shown in Fig. 1, consisting of a circular cylindrical resonator, although I may choose many other shapes of resonators.

It has been shown by W. W. Hansen, Physical Review, vol. 47, for January 15, 1935, and by W. W. Hansen and J. G. Beckerly, Proceedings of the Institute For Radio Engineers, vol. 24, of December 1936, that all possible non-singular solutions of the wave equation in cylindrical coordinates $\rho, z, \phi$ may be obtained by setting E (the electric field vector) in such a cavity equal to one or the other of the following two functions and taking B (the magnetic field vector) in such a cavity equal to the other. The functions are:

$$A_{2,n} = e^{i(k_z \cos \theta' + n\phi)} \left[ \overline{k_\rho} \frac{-in}{\rho} J_n(k\rho \sin \theta') - \overline{k_\phi} \frac{d}{d\rho} J_n(k\rho \sin \theta') \right] \quad (2)$$

$$A_{3,n} = e^{i(k_z \cos \theta' + n\phi)} \left[ \overline{k_\rho} i \cos \theta' \frac{d}{d\rho} J_n(k\rho \sin \theta') - \overline{k_\phi} \frac{n \cos \theta'}{\rho} J_n(k\rho \sin \theta') + \overline{k_z} k \sin^2 \theta' J_n(k\rho \sin \theta') \right] \quad (3)$$

The above equations are developed in the last of the hereinbefore noted publications and appear on page 1610 therein. Qualitative drawings of a few of these vector functions are shown in the figures contained in this noted page.

The boundary conditions are met by proper choice of $n$, $\sin \theta'$, and $k$. Let the resonator be a cylinder of radius $(a)$, closed by flat ends perpendicular to the $z$ axis, and spaced apart by a distance $2z_0$. To make the tangential component of E vanish on the cylinder conducting surface:

$$J(ka \sin \theta') = 0 \quad (4)$$

or $$J'(ka \sin \theta') = 0 \quad (5)$$

depending upon which function as defined by Equations 2 and 3 is taken to define E. To make the tangential component of E vanish on the conducting end walls of the resonator, there must be found a relation between $2z_0$ and the number of half waves between the two ends of the resonator. From these conditions, $\lambda$ is found to be defined by:

$$\frac{2\pi}{\lambda} = \sqrt{\left(\frac{m\pi}{2z_0}\right)^2 + \left(\frac{x}{a}\right)^2} \text{ for } J_n(x) = 0 \quad (6)$$

or:

$$\frac{2\pi}{\lambda} = \sqrt{\left(\frac{m\pi}{2z_0}\right)^2 + \left(\frac{x'}{a}\right)^2} \text{ for } J_n'(x') = 0 \quad (7)$$

where $m$ is any integer in the first case, and any integer greater than zero in the second case.

For a cylinder of fixed $(a)$ with $z_0$ as a variable, if we use $\theta'$ as a parameter, (6) and (7) become:

$$\frac{\lambda}{a} = \frac{2\pi}{x'} \sin \theta' \text{ for } J_n(x) = 0 \quad (8)$$

and $$\frac{2z_0}{a} = \frac{m\pi}{x'} \tan \theta' \text{ for } J_n'(x') = 0 \quad (9)$$

where $m$ is defined in each case as before.

For reasons to be further explained, I choose the mode corresponding to the set of functions (8), wherein $n$ is zero and there are no nodes in either $r$ or $z$; i. e., I choose the lowest root of $J_0' = 0$ for $x$ and let $m=1$. The corresponding wave functions are:

$$E\rho = 0 \quad (10)$$
$$E\phi = J_1(k\rho \sin \theta') \cos (kz \cos \theta') \quad (11)$$
$$E_z = 0 \quad (12)$$
$$B\rho = \cos \theta' \, J_1(k\rho \sin \theta') \sin (kz \cos \theta') \quad (13)$$
$$B\phi = 0 \quad (14)$$
$$B_z = \sin \theta' \, J_0(k\rho \sin \theta') \cos (kz \cos \theta') \quad (15)$$
$$ka \sin \theta' = 3.83 \quad (16)$$
$$kz_0 \cos \theta' = \pi/2 \quad (17)$$

I choose this mode of excitation for the following reasons. All modes with $n=0$ and $E_z=0$ have $B\phi=0$, so that the currents in the resonator wall, which are always at right angles to B, run only in the $\phi$ direction. Thus, if $z_0$ is made variable by converting one of the end walls of the resonator into a movable piston, no currents flow across the contact between the piston and the cylinder, thus avoiding the large losses usually introduced by sliding contacts. It is also possible for me to place in the resonator, wires of resistance material which act to suppress undesired modes of oscillation and which do not affect the chosen mode, i. e., in such a manner that for the chosen mode, no currents are caused to flow in the wires and if any other modes become excited, current will be induced in the wires so that, if I choose the wire resistance properly, these other modes will be damped out because of energy loss in the wires.

It is to be noted that some of the modes of oscillation of a particular cavity resonator may have the same frequency with different field configurations. If one of such modes is a desired mode, the damping wires of the present invention will suppress the undesired mode, despite its equal frequency, since these damping wires discriminate on the basis of field configuration rather than on the basis of frequency.

Furthermore, the resonant frequency of the wave meter resonator, although tuned to be resonant to the frequency of the desired mode of oscillation, will no longer be resonant to the undesired mode of oscillation when the damping wires are present, since the use of such damping wires shifts the resonant frequency of the resonator with respect to the undesired mode in addition to lowering the Q of the resonator for this undesired mode. Effectively, therefore, the use of such damping wires causes the resonator to simultaneously have two different resonant frequencies for these two modes, despite the fact that the two modes may have equal frequencies. In effect, the resonant frequency of the resonator is shifted for the undesired mode.

In Fig. 1 there is illustrated a circular cylindrical cavity resonator wavemeter designed in accordance with these principles. Conducting circular cylindrical wall 1 has conducting end wall 2 mounted by screw threads upon the tubular member, the wall 2 being perpendicular to the cylinder axis. The opposite conducting end wall 3 is parallel to end wall 2 and is mounted on rod member 5, which in turn is positioned to move wall 3 axially in cylinder 1, thus altering the volume of the resonator cavity. Situated at the periphery of wall 3 is a flange member 4 which is arranged concentric to rod 5. Flange member 4 is of external diameter very nearly equal to the internal diameter of cylindrical wall 1. The diametrical difference between these parts is determined by mechanical convenience. As has been previously shown, the electric field of the mode of oscillation chosen to be excited in a resonant volume is everywhere parallel to the circumferential crack separating the parts 1 and 4. The width of flange 4 is determined by the fact that the field decreases in amplitude axially along the flange 4 by a factor $\epsilon^{-x}$ for each interval equal to the width of the crack or gap between flange 4 and cylindrical wall 1, ($\epsilon$ being, of course, the base of the Napierian logarithmic system) so that the flange length is chosen long enough to provide attenuation suitable to substantially prevent leakage.

Concentric line transmission leads 6, 6' are provided for the introduction of the ultra high frequency energy whose wavelength is to be investigated, and for removal of a portion of the energy in the field thus excited for measurement of the relative field strength thereby excited, by means well known to the art and consequently not specifically shown herein. The type of field preferred to excite this resonator is shown in graphic form in Figs. 4 and 6, wherein the instantaneous electric field $E\phi$ is shown in Fig. 4, and the corresponding magnetic field $B_z$ is shown in Fig. 6, as defined by Equations 11 and 15, respectively. To couple concentric line members 6, 6' to this type of field, coupling loops 7, 7' are provided as shown in Fig. 3, arranged perpendicular to the lines of magnetic force shown in Figs. 6 and 7. The placement of concentric line members 6, 6' is not critical; and they are placed oppositely and about centrally along the active conducting surface of the cylinder wall 1 purely for illustrative purposes.

Conducting rod 8, mounted in end wall 2, provides support for wires 9, 10 and 11, which are maintained in tension by springs 12 mounted outside of end wall 2 in clamp members 14, the tension on wires 9, 10 and 11, being adjustable by means of screws 13. Wires 9, 10, 11 have a resistance on the order of 30 ohms, this value being generally suitable to introduce effective critical damping to any mode of oscillation whose lines of magnetic flux link the wires. The length of the support rod 8 is chosen to be on the order of half the distance between the end walls 2 and 3, although this value is also not critical. In general, wires 9, 10, 11 are placed so as to be everywhere at right angles to the electric field E of the preferred mode of oscillation, so that no currents are induced in said wire by the preferred oscillation. On the other hand, other modes have, in general, $\rho$ and $z$ components of E, so that they all induce currents in wires 9, 10, 11.

As shown in Figs. 8 and 9, other configurations are useful for the damper wires 9, 10, 11 of Fig. 1. In place of a trio of such wires, I may provide four, or other symmetrical arrangement thereof, as illustrated by wires 9', 10', 11', 12' of Fig. 8. In place of the unisymmetrical arrangement of Figs. 1 and 8, a configuration as illustrated by Fig. 9 may be used, wherein supporting post 8 is dispensed with, and oriented damper wires 9'', 10'', 11'' bound two imaginary triangular pyramids with common vertices, parallel ends, and whose extended edges coincide. A plurality of such wires 9'', 10'', 11'' may be used. It has been found by experiment that a resonator wavemeter of such design affords the desired great increase in accuracy and resolving power over that of other types of cavity wavemeters.

End walls 2 may be provided of various thicknesses, so as to alter the volume of the resonator cavity in steps, thus providing stepped overlapping ranges over which the resonator may function in cooperation with movable wall 3. For a given thickness of end wall 2, I provide screw means for varying the resonant frequency of the wavemeter over a continuous range. Rod member 5 has its end opposite resonator wall 3 provided with threads, upon which nut 14' rotates. Nut 14' is held from lateral displacement by means presently to be described, so that rotation of the nut causes axial displacement of rod 5. Spring loading of nut 14' is provided by nut 15 which is also mounted on the thread of rod 5. Nut 15 is slidably engaged by rods 16, which maintain nuts 14' and 15 at zero relative angular displacement. Compression spring 17 is mounted concentric to rod 5. Rods 16 have one end rigidly embedded in nut 14', so that the spring 17 forces nut 15 always against one face of the thread of rod 5, thus preventing backlash. Mounted on nut 14' is bearing member 18, which is clamped in stationary housing 19 by flange 21. Housing 19 is suitably fixed in position on a support member 20. Nut 14' is provided with knurled index head 22, having scaled indications marked on its face 23, arranged adjacent to a fiducial mark 24 situated on housing 19.

Pointer 25, which is attached to rod member 5, extends through slot 26 in tubular member 27 which is attached to housing 19 concentric to rod 5, as seen in Fig. 1. Support member 29 holds the opposite end of tubular member 27. Scale 28, cooperating with pointer 25, then provides rough indexing; scale 23, cooperating with fiducial mark 24, providing a fine index. The scales 23 and 28 may be calibrated in arbitrary units corresponding to tabulated values of wavelength.

To prevent rotation of rod member 5 about its own axis and to provide rod 5 with a bearing adjacent to wall 3, the structure shown in Fig. 2 is employed. Rod member 5 is supported roughly concentrically to tubular member 27 by means of hardened balls 38 and 39 in the ends of set screws 34, 35, respectively. Set screws 34, 35, may be set opposite the vertical coordinate of Fig. 2 by equal angles, say by about 60°. Rod member 5 is provided with key 30, as shown in Figs. 1 and 2. Key 30 is made to bear against hardened ball 40, in set screw 33 mounted approximately vertically in tubular member 27 by means of wire 32 which is held in key 30 by means of fastener 31 and spring 36, which is in turn fastened to hook 37 in base 29. Spring 36 thus prevents rotation of rod 5 and also holds it in firm contact with ball bearing surfaces 38, 39. These bearing surfaces, being made adjustable by means of set screws 34, 35, provide means of making the movable end wall 3 of the resonator exactly concentric with the cylindrical resonator wall 1.

It is evident to those skilled in the art that this mode of electrical operation and this mechanical design may be provided for any type of cylindrical resonator, although the principle of this invention has been illustrated in a cavity resonator wavemeter of circular cylindrical shape, i. e., the cross-section of the cylinder may be modified greatly and yet not depart from the inventive concepts herewith disclosed.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A resonator wavemeter of the variable volume cavity type having a movable end wall by which its volume is varied to obtain a resonant condition therein, means for introducing short wave electromagnetic energy, whose wavelength is to be measured, into the resonator wavemeter to obtain a desired mode of oscillation therein in which the produced lines of electrical force are situated in parallel relation with respect to the movable end wall, means within said resonator wavemeter for damping out other than the directionally defined desired mode of oscillation in the same, and wavelength indicating means movable with said movable end wall for providing a determination of the wavelength of the energy received by the resonator wavemeter.

2. A resonator wavemeter as defined in claim 1 in which said damping means comprises resistor elements extending at right angles to the electrical component of the received electromagnetic energy.

3. A resonator wavemeter of the variable volume cavity, cylinder type having a movable end wall by which its volume is varied to obtain a resonant condition therein, means for introducing short wave electromagnetic energy, whose wavelength is to be measured, into the resonator wavemeter to obtain a controlled mode of oscillation therein in which the tangential component of the electric field portion of the electromagnetic waves is reduced to zero at the surface of the cylinder, means within said resonator wavemeter for damping out other than the controlled mode of oscillation in the same, and wavelength indicating means movable with said movable end wall for providing a determination of the wavelength of the energy received by the resonator wavemeter.

4. A resonator wavemeter of the variable volume to surface area ratio, cavity, non-reentrant, cylinder type having a fixed conducting flat wall at one end of the cylindrical resonator, a movable conducting flat piston-like wall, parallel to the fixed end wall, at the other end of the cylindrical resonator, by which its volume to surface area ratio is varied to obtain a resonant condition therein, means for introducing short wave electromagnetic energy, whose wavelength is to be measured, to the resonator wavemeter to obtain a controlled mode of oscillation in which the tangential component of the electric field portion of the electromagnetic waves is reduced to zero at the surface of the cylinder and there is no resultant flow of current across the area between the rim of the piston-like end wall and the inner surface of the cylinder, means positioned on the interior of the fixed conducting wall of the resonator wavemeter for damping out other than the controlled mode of oscillation in the same, and wavelength indicating means movable with said piston-like end wall for providing a determination of the wavelength of the energy received by the resonator wavemeter.

5. A resonator wavemeter of the variable volume, cavity, cylinder type having damping means therein consisting of wall connecting tautly positioned resistance wires symmetrically positioned within the same to suppress undesired modes of oscillation therein.

6. A resonator wavemeter of the variable volume to surface area ratio, cavity, non-reentrant, cylinder type having a fixed circular flat end wall closing one end of the same and a movable piston-like member closing the other end thereof, arranged in parallel relation to the fixed end wall, damping means mounted within the resonator wavemeter for suppressing undesired modes of oscillation therein consisting of a plurality of resistance wires having one end thereof fixed to a post extending perpendicular from the center of the fixed circular flat end wall and whose opposite ends are equidistantly spaced about the periphery of the circular end wall and secured thereto by an equal number of resilient connections by which each of the wires is tautly positioned.

7. A resonator wave meter comprising a hollow cavity resonator having a movable end wall, means for exciting an oscillating electromagnetic field within said resonator having a desired mode of oscillation, and means having substantial resistance within said resonator for suppressing modes of oscillation other than said desired mode of oscillation in said resonator.

8. High frequency apparatus comprising a hollow cavity resonator, means for exciting said resonator with electromagnetic energy in a predetermined mode of oscillation, and means having substantial resistance for suppressing oscillations of modes other than said predetermined mode.

9. A resonator wave meter comprising a tunable cavity resonator and damping means therein comprising symmetrically positioned resistance wires adapted to suppress undesired modes of operation therein.

10. A resonator wave meter as in claim 9 wherein said resistor wires are supported at one end by a conducting supporting member extending within said resonator.

11. A resonator wave meter as in claim 9 wherein said resistance wires extend from one wall of said resonator to the other wall of said resonator.

12. High frequency apparatus comprising a hollow cavity resonator, means for exciting said resonator with electromagnetic energy in a predetermined mode of oscillation, and means for suppressing oscillations of modes other than said predetermined mode, said last-named means comprising a resistor element positioned substantially perpendicularly to the electric field of said desired mode of oscillation and non- perpendicularly to the electric field of said undesired modes of oscillation.

WILLIAM W. HANSEN.

REFERENCES CITED

The following references are of record in the file of this patent:

UNITED STATES PATENTS

| Number | Name | Date |
| --- | --- | --- |
| 2,250,096 | Engbert | July 22, 1941 |
| 2,106,771 | Southworth | Feb. 1, 1938 |